United States Patent
Krishnamurti (12) 
(10) Patent No.: US 6,535,817 B1
(45) Date of Patent: Mar. 18, 2003

(54) METHODS, SYSTEMS AND COMPUTER PROGRAM PRODUCTS FOR GENERATING WEATHER FORECASTS FROM A MULTI-MODEL SUPERENSEMBLE

(75) Inventor: Tiruvalam N. Krishnamurti, Tallahassee, FL (US)

(73) Assignee: The Florida State Research Foundation, Tallahassee, FL (US)

(*) Notice: Subject to any disclaimer, the term of this patent is extended or adjusted under 35 U.S.C. 154(b) by 0 days.

(21) Appl. No.: 09/712,072

(22) Filed: Nov. 13, 2000

Related U.S. Application Data (60) Provisional application No. 60/164,628, filed on Nov. 10, 1999.

(51) Int. Cl.[7] .............................................. G06F 169/00
(52) U.S. Cl. ................................................................ 702/3
(58) Field of Search ....................... 702/3, 4, 2; 342/26; 703/2, 6; 706/931

(56) References Cited

PUBLICATIONS

Krishnamurti et al., "Improved Weather and Seasonal Climate Forecasts from Multimodel Superensemble", Science, vol. 285 No. 5433, Sep. 3, 1999, pp 1548–1550.*

\* cited by examiner

*Primary Examiner*—Donald E. McElheny, Jr.
(74) *Attorney, Agent, or Firm*—Sutherland Asbill & Brennan LLP (57) ABSTRACT

A superensemble is developed using a plurality of forecasts from a variety of weather and climate models. Along with observed analysis fields, these forecasts are used to derive statistics on the past behavior of the models. These statistics, combined with future forecasts of the models, enables the construction of a superensemble forecast. More specifically, given a set of past model forecasts, the present invention uses a multiple regression technique to regress the model forecasts against observed fields. Least-squares minimization of the difference between the model and the analysis field is used to determine the weights of each model component at any geographic location and vertical level. Therefore, the superensemble generates a model that combines the historical performance of forecasting data from multiple models at a large number of geographic areas or regions. Furthermore, the superensemble model can combine the historical performance of multiple models in forecasting one weather condition at any geographic location.

29 Claims, 5 Drawing Sheets

METHODS, SYSTEMS AND COMPUTER PROGRAM PRODUCTS FOR GENERATING WEATHER FORECASTS FROM A MULTI-MODEL SUPERENSEMBLE

RELATED APPLICATION DATA

This application claims priority from U.S. Provisional Patent Application, Serial No. 60/164,628, filed Nov. 10, 1999, titled "Weather and Seasonal Climate Forecasts From Multi-Model Super Ensemble", the contents of which are incorporated entirely herein by reference.

FIELD OF THE INVENTION

The present invention relates generally to weather forecasts, and more specifically, to weather and seasonal forecasts generated from an assembly of forecast models.

BACKGROUND OF THE INVENTION

Because of the importance of the weather, forecasts are readily available via a wide variety of media, including the Internet, television, radio and print media. Images of the weather generated by satellite photographs and radar networks are familiar to almost everyone. Nevertheless, despite a long history of the study of the atmosphere and its phenomena, and enormous technological and scientific advances, local, regional and seasonal forecasts often are inaccurate.

Meteorology as an exact science is a relatively recent science. However, as an inexact science, meteorology has been around for a long time. It is widely agreed that the word 'meteorology' was coined by the Greek philosopher Aristotle, who wrote a book entitled Meteorologica circa 350 BC. In this work Aristotle attempted to explain atmospheric phenomena, such as clouds, wind, precipitation, lightning, thunder, and climatic changes. Although much of the work disclosed in Meteorologica was erroneous, it was not until the 17th century that his ideas were scientifically disproved.

The origins of meteorology as a natural science occurred in the late 16th century. At this time it had become evident that the speculations of philosophers regarding meteorology were inadequate and that better scientific knowledge was essential to understand the atmosphere. Therefore, it was realized that instruments were necessary to measure properties on Earth's atmosphere. As a result, instruments such as the hygrometer, thermometer, and barometer were developed. These instruments measured atmospheric data and helped identify changes in weather. However, the weather forecasting effectiveness of such instruments, combined with the understanding of atmospheric processes at the time, were minimal.

It was not until the twentieth century that more detailed scientific instruments and knowledge were cultivated to help predict daily and seasonal climate changes. For instance, in the 1940s measurements of upper level meteorological components, such as temperature, humidity, pressure, and wind speed and direction, became possible by placing instruments on balloons that were released into the atmosphere. Meteorological science took an additional step forward in the 1950's with the development of computers. Computers enabled models to be developed utilizing equations that approximated the physical processes of the atmosphere. These physical relationships are currently used in weather forecasting in an attempt to predict the future behavior of the atmosphere. To construct weather models computers use data collected from sophisticated instruments, such as RADAR and meteorological satellites, which provide monitoring of world weather events. Data from these instruments have been instrumental in improving our knowledge of all weather systems, including fronts, thunderstorms, hurricanes, and other weather events.

Weather and seasonal forecasting and prediction is a sophisticated art that utilizes measurements taken continuously from geographic areas around the globe. These measurements include temperature, wind speed, height of pressure gradient, humidity, precipitation, and the like, collected from weather balloons, weather stations, satellites, aircraft, buoys, and similar measurement equipment and/or facilities. Using these and other advancements in remote-sensing technologies to collect data, computer models for forecasting weather conditions have been developed.

Because of the collection and analysis of a vast amount of data from around the world and the numerical simulation of meteorological and climatological processes, supercomputers and the latest advanced mathematical techniques are an integral part of the science of the atmosphere. Using such equipment, one broad area of meteorological research encompasses the observation, numerical modeling, and prediction of weather systems such as hurricanes and severe storms. Today, sophisticated numerical models used in operational and research centers throughout the globe routinely make short-term (1 to 7 days in advance) weather and seasonal (one to several seasons in advance) climate forecasts. Models and projections are developed by the National Weather Service (the governmental entity in the United States charged with disseminating weather data to the public) and other private forecasting firms. Nevertheless, despite the vast scientific and technological improvements and advances in meteorology, including the modeling of weather using data accumulated by weather-monitoring instruments, weather prediction and models are often inaccurate, vague, broad, and lack regional or local specificity.

Because of the impact of weather on our daily lives, it is an understatement that it would be beneficial if we could predict both the short term and long term weather. Therefore, what is needed is a forecasting method and system that permits more accurate weather forecasts based upon the vast collection of data provided by scientific weather instruments. What is also needed is a forecasting method and system that can more accurately forecast climatological or seasonal weather changes.

SUMMARY OF THE INVENTION

Systems, methods and computer program products of the present invention collect historical forecast information generated from a plurality of weather models (or forecast models), where each model forecasted at least one predicted weather component. For example, a weather model may include a forecasted temperature (predicted weather component) for a specific geographical location for a certain past date or time period. Systems, methods and computer program products of the present invention compare the historical forecast information, and more particularly, the predicted weather components, generated by the plurality of weather models to observed weather data to determine the historical performance of the weather models. According to one aspect of the invention, the historical performance is the accuracy with which a weather model predicts a particular weather component. Thereafter, each model is weighted based upon the historical performance of that model in predicting a weather component at a particular geographic location or a range of geographical locations. The weighted weather models are then combined to generate a multi-model superensemble. The multi-model superensemble utilizes the historical performance of every weather model in forecasting weather components to generate a weather forecast for a future period of time.

More specifically, according to the present invention, a multi-model superensemble is developed using a plurality of forecasts from a variety of weather and climate models. Along with observed (or benchmark) analysis fields, these forecasts are used to derive statistics on the past behavior of the models. These statistics, combined with model forecasts, enables the construction of a superensemble forecast. More specifically, given a set of past model forecasts, the present invention uses a multiple regression technique to regress the model forecasts against observed (analysis) fields. Least-squares minimization of the difference between the model and the analysis field is used to determine the weights of each model component at any geographic location and vertical level.

According to one embodiment of the present invention, there is disclosed a method for generating an accurate weather forecast model. The method includes the steps of collecting historical forecast information from a plurality of weather models, wherein the historical forecast information includes at least one predicted weather component, and wherein the historical forecast information corresponds to a past period of time. The method also includes accumulating observed weather data, wherein the observed weather data corresponds to a plurality of known weather values, wherein at least one known weather value of the plurality of known weather values corresponds to the at least one predicted weather component, and wherein the observed weather data corresponds to the past period of time. The method further includes comparing the historical forecast information to the observed weather data to determine the historical performance of each weather model of the plurality of weather models, and generating a multi-model superensemble of the weather models, wherein the multi-model superensemble is based upon the historical performance of each weather model of the plurality of weather models.

According to one aspect of the invention, comparing the historical forecast information to the observed weather data to determine the historical performance of each weather model includes comparing the at least one known weather value to at least one predicted weather component. According to another aspect of the invention, comparing the at least one known weather value to the at least one predicted weather component includes calculating at least one weight factor for the at least one predicted weather component. Furthermore, comparing the at least one known weather value to the at least one predicted weather component can include calculating at least one weight factor for the at least one predicted weather component by least squares minimization.

According to yet another aspect of the present invention, generating a multi-model superensemble of the weather models includes generating a multi-model superensemble based upon a combination of weather models weighted by their respective historical performances. Additionally, generating a multi-model superensemble of the weather models can include generating a multi-model superensemble based upon a summation of the at least one weight factor for the at least one predicted weather component of each of the plurality of weather models.

The method can further include collecting future forecast information from the plurality of weather models corresponding to a future period of time, and wherein generating a multi-model superensemble includes generating a multi-model superensemble based upon the historical performance of each weather model of the plurality of weather models and the future forecast information. Moreover, generating a multi-model superensemble can include weighting the future forecast information from the plurality of weather models based upon the historical performance of each weather model of the plurality of weather models.

According to another embodiment of the present invention, there is disclosed a method for generating accurate weather forecasts. The method includes collecting historical forecast information from a plurality of weather models, wherein the historical forecast information includes at least one predicted weather component, and wherein the historical forecast information corresponds to a past period of time. The method also includes accumulating observed weather data corresponding to a plurality of known weather values, wherein at least one known weather value of the plurality of known weather values corresponds to the at least one predicted weather component, and wherein the observed weather data corresponds to the period of time. The method further includes comparing the historical forecast information to the observed weather data to determine the historical performance of each weather model of the plurality of weather models, and calculating at least one weight for each weather model, based upon the historical performance of each weather model in forecasting the at least one predicted weather component. Finally, the method includes combining the weights for each weather model with future forecast information from the plurality of weather models, wherein the future forecast information corresponds to a future period of time, to generate a multi-model superensemble forecast.

According to one aspect of the invention, generating a multi-model superensemble forecast includes combining the weather models, wherein each model is weighted based on its respective weight. According to another aspect of the invention, comparing the historical forecast information to the observed weather data to determine the historical performance of each weather model includes comparing the at least one known weather value to the at least one predicted weather component. According to yet another aspect of the present invention, comparing the at least one known weather value to the at least one predicted weather component includes calculating at least one weight factor for the at least one predicted weather component. Additionally, in the method of the present invention, comparing the at least one known weather value to the at least one predicted weather component can include calculating at least one weight factor for the at least one predicted weather component by least squares minimization.

According to yet another embodiment of the invention, there is disclosed a method for generating accurate weather forecasts. The method includes accumulating historical forecast information from a plurality of weather models, where the historical forecast information is derived prior to the occurrence of weather forecasted by the plurality of weather models, and wherein the historical forecast information includes a plurality of predicted weather components related to expected weather conditions. The method also includes collecting observed weather data after the occurrence of the weather forecasted by the plurality of weather models, wherein the observed weather data includes known weather values corresponding to at least some of the plurality of predicted weather components, and weighting the historical performance of each weather model in predicting the plurality of predicted weather components by comparing the accumulated historical forecast information to the observed weather data. Further, the method includes generating a superensemble weather model based upon a combination of each weighted weather model.

According to one aspect of the invention, weighting the historical performance of each weather model in predicting the plurality of predicted weather components includes weighting the historical performance of each weather model by a least squares minimization calculation between each weather model and the observed weather data. According to another aspect of the invention, generating a superensemble weather model based upon a combination of each weighted weather model includes combining each weighted weather model to develop a forecast for future weather conditions.

According to yet another embodiment of the present invention, there is disclosed a system for generating an accurate weather forecasting model. The system includes a plurality of weather models, wherein the weather models include historical forecasts for past weather conditions and prospective forecasts for future weather conditions, observed weather data corresponding to the past weather conditions, and a superensemble generator. The superensemble generator is in communication with the plurality of weather models and observed weather data, for producing a superensemble forecast, and the superensemble generator determines the historical performance of the plurality of weather models based on a comparison of the historical forecasts for past weather conditions to the observed weather data. Additionally, the superensemble forecast is based at least in part upon the historical performance of the plurality of weather models and the prospective forecasts for future weather conditions.

According to one aspect of the invention, the historical forecasts include at least one predicted weather component, wherein the observed weather data corresponds to a plurality of known weather values, and wherein at least one known weather value of the plurality of known weather values corresponds to the at least one predicted weather component. According to another aspect of the invention, the observed weather data consists of data selected from the group consisting of precipitation, temperature, wind speed and direction, height, pressure, atmospheric moisture content, and tropical cyclone positions and intensities. According to yet another aspect of the invention, the superensemble generator is in communication with the plurality of weather models via the Internet, a wide area network, or a local area network. Finally, according to another aspect of the invention, the superensemble generator includes a processor, and a superensemble module in communication with said processor, wherein the superensemble module and processor operate to compare the historical forecasts to the observed weather data to determine the historical performance of the plurality of weather model.

According to yet another embodiment of the present invention, there is disclosed a computer program product for generating an accurate weather forecast model, comprising a computer readable storage medium having computer-readable program code means embodied in said medium. The computer-readable program code means include computer-readable program code means for collecting historical forecast information from a plurality of weather models, wherein the historical forecast information includes at least one predicted weather component, and wherein the historical forecast information corresponds to a past period of time, and computer-readable program code means for accumulating observed weather data, wherein the observed weather data corresponds to a plurality of known weather values, wherein at least one known weather value of the plurality of known weather values corresponds to the at least one predicted weather component, and wherein the observed weather data corresponds to the past period of time. The computer readable program code means also include computer readable program code means for comparing the historical forecast information to the observed weather data to determine the historical performance of each weather model of the plurality of weather models, and computer-readable program code means for generating a multi-model superensemble of the weather models, wherein the multi-model superensemble is based upon the historical performance of each weather model of the plurality of weather models.

According to one aspect of the invention, the computer-readable program code means for comparing the historical forecast information to the observed weather data to determine the historical performance of each weather model comprises computer-readable program code means for comparing the at least one known weather value to the at least one predicted weather component. According to another aspect of the invention, the computer-readable program code means for comparing the at least one known weather value to the at least one predicted weather component comprises computer-readable program code means for calculating at least one weight factor for the at least one predicted weather component. According to yet another aspect of the invention, the computer-readable program code means for comparing the at least one known weather value to the at least one predicted weather component comprises computer-readable program code means for calculating at least one weight factor for the at least one predicted weather component by least squares minimization. Furthermore, the computer-readable program code means for generating a multi-model superensemble of the weather models can comprise computer-readable program code means for generating a multi-model superensemble based upon a combination of weather models weighted by their respective historical performances.

According to yet another aspect of the invention, the computer-readable program code means for generating a multi-model superensemble of the weather models comprises computer-readable program code means for generating a multi-model superensemble based upon a summation of the at least one weight factor for the at least one predicted weather component of each of the plurality of weather models. The computer readable program code means can additionally include computer-readable program code means for collecting future forecast information from the plurality of weather models corresponding to a future period of time, and wherein the computer-readable program code means for generating a multi-model superensemble comprises computer-readable program code means for generating a multi-model superensemble based upon the historical performance of each weather model of the plurality of weather models and the future forecast information. Finally, the computer-readable program code means for generating a multi-model superensemble can include computer-readable program code means for weighting the future forecast information from the plurality of weather models based upon the historical performance of each weather model of the plurality of weather models.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention is described below with reference to block diagrams and flowchart illustrations of methods, apparatus (i.e., systems) and computer program products according to an embodiment of the invention. It will be understood that each block of the block diagrams and the flowchart illustrations, and combinations of blocks in the block diagrams and combinations of the blocks in the flowchart illustrations, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks of the flowchart, or clock or blocks of the diagrams.

Accordingly, blocks of the block diagrams and the flowchart illustrations support combinations of means for performing the specified functions, combinations of steps for performing the specified functions and program instruction means for performing the specified functions. It will also be understood that each block of the block diagrams and the flowchart illustrations, and combinations of the respective blocks, can be implemented by special purpose hardware-based computer systems which perform the specified functions or steps, or combinations of special purpose hardware and computer instructions.

Briefly, systems, methods and computer program products of the present invention collect historical forecast information generated from a plurality of weather forecast models, where each model forecasts at least one predicted weather component. Systems, methods and computer program products of the present invention compare the historical forecast information generated by the forecast models to observed weather data to determine the historical performance of the forecast models. Thereafter, each model is weighted based upon the historical performance of that model in predicting a weather component at a particular geographic location or geographical area. The forecast models are then combined to generate a multi-model superensemble. The multi-model superensemble utilizes the historical performance of every forecast model in forecasting a particular weather component to generate a weather forecast for a future period of time. In this manner, a combination of weather forecasts can be used to create a multi-model superensemble that is based upon the historically most accurate weather components from each weather model. The systems, methods and computer program products of the present invention can be used for generating accurate short term and long term forecasts.

Figure 1:
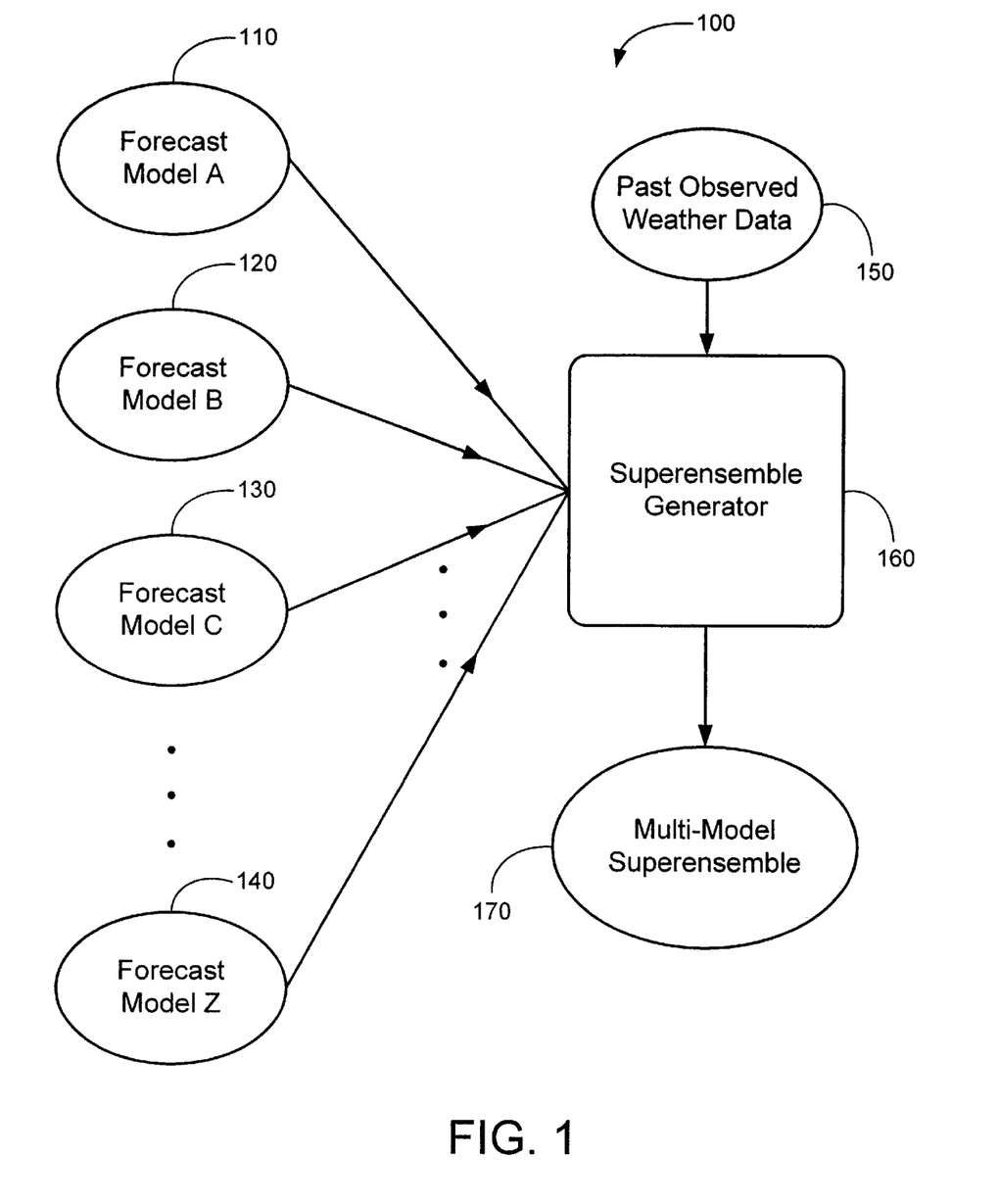
FIG. 1 shows a high level block diagram of a forecasting system of the present invention, according to on e embodiment of the present invention.

FIG. 1 shows a block diagram of a forecasting system 100 according to one embodiment of the present invention, including a plurality of forecast models 110, 120, 130, 140, observed weather data 150, a superensemble generator 160, and a multi-model superensemble 170. According to one aspect of the invention, the forecasting system 100 is representative of any network through which the superensemble generator 160 can communicate with the forecast models 110, 120, 130, 140 and observed weather data 150, such as via a local area network, a wide area network, the Internet, or the like. Similarly, the individual components 110, 120, 130, 140, 150, 160 can be components of separate networks in communication with each other through telephone or computer networks, or a combination thereof. For example, according to one aspect of the present invention, with the superensemble generator 160 may be in communication with the components of the forecasting system 100 via an Internet connection. Thus, as will be appreciated by those of skill in the art, the modes of communication between the entities of the forecasting system 100 of FIG. 1 may be accomplished by any well known communication means, and are not limited to any particular means stated herein.

As illustrated in FIG. 1, the forecast models 110, 120, 130, 140 represent forecast models containing forecast information corresponding to at least one weather component. As used herein, a weather component can include precipitation, temperature, wind speed and direction, height, pressure, atmospheric moisture content, tropical cyclone positions and intensities, or other meteorological data, as are well known in the art, forecasted for a particular geographical area or location, where the geographical location or area can be defined by longitude, latitude, and elevation, or ranges thereof. Additionally, the weather components can include data corresponding to elements of a long term forecast, so that the models can correspond to climate models. Thus, according to one aspect of the invention, the weather components can correspond to median or averaged values determined by a model. For instance, forecast model 110 could include a weather component that is the predicted temperature, measured in degrees Celsius, at 1000 feet above sea level at 33° North, 84° West. It will be appreciated that although four forecast models are illustrated in FIG. 1, any number of forecast models may be in communication with the superensemble generator 160 of the present invention.

Also illustrated in FIG. 1 is observed weather data 150. The observed weather data 150 includes a plurality of known weather values, at least one of which corresponds to a weather component of at least one of the forecast models 110, 120, 130, 140. For instance, referring to the above illustrative example, the observed weather data can include the measured temperature, in degrees Celsius, at 1000 feet above sea level at 33° North, 84° West. This observed data 150 is used to determine the historical performance of each the forecast models 110, 120, 130, 140 in predicting weather components. It should be appreciated that although the observed weather data 150 may emanate from actual measurements using meteorological instruments, the observed weather data may alternatively be a best estimate of conditions based upon measurements, for instance, using one or more nearby instruments. Thus, known weather values include both known weather measurements or derived weather values so that the either measured or derived values can comprise the observed weather data that is compared to historical forecast information. Typically, the observed weather data 150 can be collected from weather centers located around the globe which monitor weather conditions, or directly from weather instruments, such as satellites. Where differing observed weather data is received for the same predicted weather component, the observed weather data can be averaged by the superensemble generator 160 to resolve differences in the observed weather data. Preferably, however, the observed weather data should be consistent regardless of the source of the data.

As illustrated by FIG. 1, the superensemble generator 160 collects historical forecast information from the plurality of forecast models 110, 120, 130, 140, where the historical forecast information includes at least one predicted weather component. The superensemble generator 160 also collects the observed weather data 150, which corresponds to a plurality of known weather values, at least one of which corresponds to the at least one predicted weather component. As will be described in detail below, the superensemble generator 160 then compares the historical forecast information returned from each of the forecast models 110, 120, 130, 140 with the observed weather data 150 to determine the historical performance of each forecast model with regard to those weather components corresponding to the observed weather data 150. The historical performance of the forecast models 110, 120, 130, 140 are then used to determine the weight of those forecasts models 110, 120, 130, 140 in generating the multi-model superensemble 170.

It will be appreciated by those of ordinary skill in the art that forecast models 110, 120, 130, 140 will often be generated from weather services around the world, and will vary in their structure in terms of geographical resolution, information contained therein, and other key aspects, such as their mathematical treatment of physics and dynamics. Thus, the weather components of each forecast model 110, 120, 130, 140 may vary. For instance, forecast model A 110 may contain one or more predicted weather components not included within forecast model B 120, and vice versa. According to one preferred embodiment however, each of the weather components from the forecast models 110, 120, 130, 140 will be the same. Additionally, while it is preferable that the observed weather data 150 includes known weather values corresponding to every predicted weather component from each one of the forecast models 110, 120, 130, 140, it is possible that the observed weather data 150 may not be available or may not correspond to each predicted weather component. As a result, it is preferred that the multi-model superensemble 170 be constructed from well-documented and universally utilized weather data, such as temperature or humidity, which is likely to be predicted and measured at the vast majority of geographical locations across the globe, to minimize the possibility that observed weather data 150 is unavailable to compare against the predicted weather components of the forecast model 110, 120, 130, 140.

Figure 2:
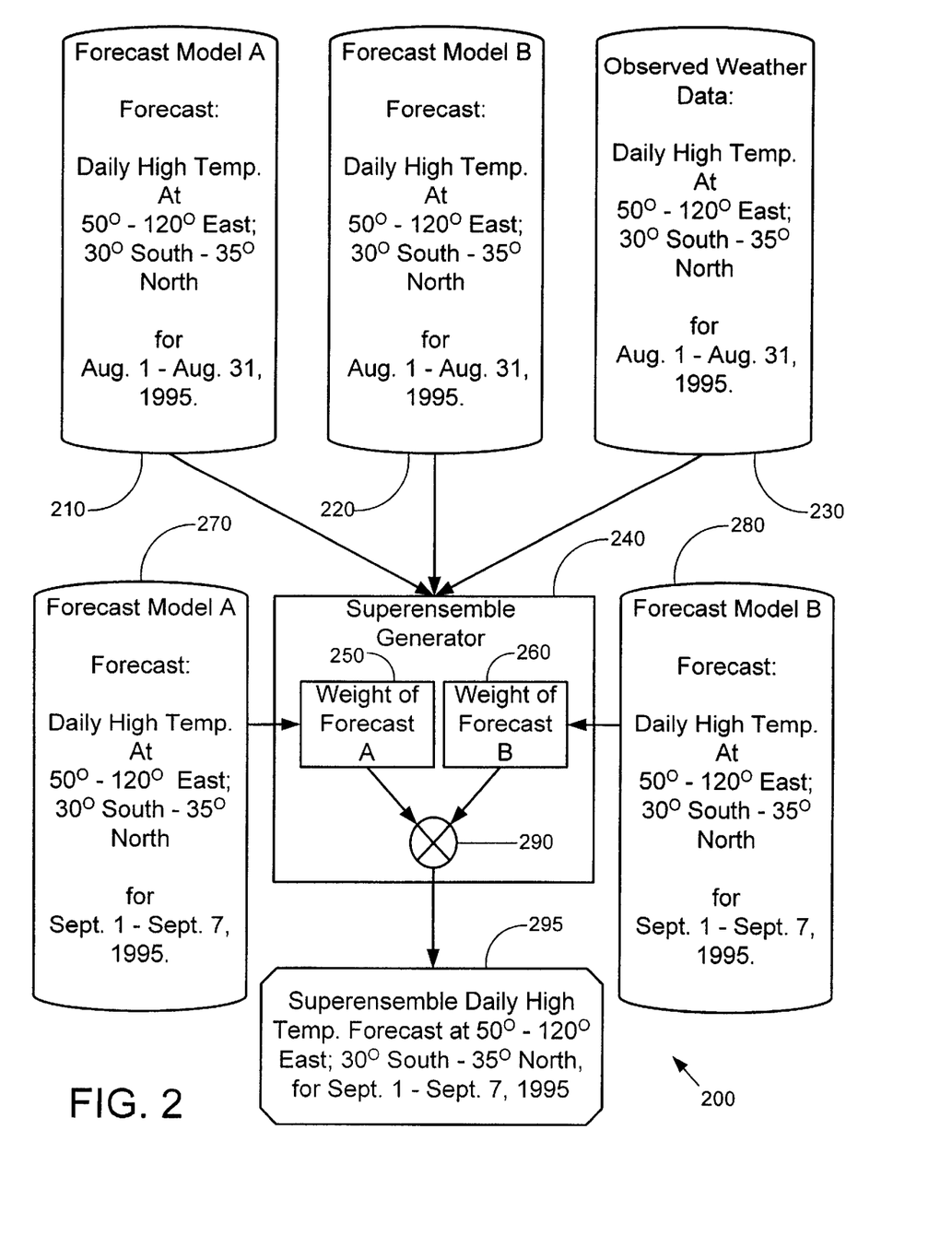
FIG. 2 shows, in block diagram form, an illustrative example of the manner in which a superensemble generator of the present invention generates a superensemble forecast, according to one aspect of the present invention.

FIG. 2 shows, in block diagram form, a simplified illustrative example of the manner in which a superensemble generator 240 of the present example generates a superensemble forecast 295. It should be noted that the example shown in FIG. 2 is for illustrative purposes only, and is not intended to limit the invention as described in detail herein. FIG. 2 shows historical forecast information 210, 220 from two forecast models A and B, where the forecast information 210, 220 from each model includes at least one predicted weather component corresponding to a past period of time. Specifically, in the illustrative example of FIG. 2, the predicted weather components for each of the forecasted models is the average high temperature for each day, Aug. 1–Aug. 31, 1995, at the geographical area defined by 50°–120° East, 30°–35° North, at sea-level. Although in the present illustrative example the forecast information 210, 220 corresponds to a predicted average daily high temperature, it should be appreciated that the forecast information 210, 220 could alternatively correspond to average high temperature taken at an alternative time interval, such as weekly. The forecast information 210, 220 is transmitted to the superensemble generator 240, which can occur either at the request of the superensemble generator 240, automatically, or upon the occurrence of a condition, such as a lapse of a specific period of time.

Also included in the illustrative example is observed weather data 230 corresponding to a plurality of known weather values. Specifically, the plurality of known weather values are observed average high temperatures for each day, Aug. 1–Aug. 31, 1995, for the geographical area defined by 50°–120° East, 30°–35° North, at sea-level. Like the forecast information 210, 220, the observed weather data 230 can correspond to a measured average high temperature for each day, or to an average temperature measured at a different time interval, such as weekly. Additionally, the observed weather data 230 can be transmitted to the superensemble generator 240 at the request of the superensemble generator 240, automatically, or upon the occurrence of a condition.

After receiving the forecast information 210, 220 and observed weather data 230, the superensemble generator 240 compares the historical forecast information 210, 220 to the observed weather data 230 to determine the historical performance of each forecast model. More specifically, the superensemble generator 240 compares the known weather values, i.e., the observed average daily high temperatures, to the predicted average daily high temperatures forecasted by forecast models A and B. As noted above, the known weather values can include values that are measured or derived. Each respective forecast model is individually compared against the observed weather data 230 to determine the historical performance of each forecast model. According to one aspect of the invention, the superensemble generator 240 calculates at least one weight factor 250, 260 corresponding to the historical performance of each forecast models. The method employed for weighting each of the forecast models will be explained in detail below with reference to FIG. 4.

Next, the superensemble generator 240 combines 290 the future forecast information 270, 280 for each forecast model, A and B, as modified by the historical performance of each model in historically forecasting the predicted weather component (i.e., the average daily high temperature), to determine a multi-model superensemble forecast 295 for a daily high temperature, forecast for each day Sept. 1–Sept. 7, 1995, for the geographical area defined by 50°–120° East, 30°–35° North, at sea-leve Therefore, it will be appreciated that the superensemble generator 240 can combine multiple forecast models to produce a multi-model superensemble that weights the historical performance of forecast models to formulate a forecast for a future period of time. Thus, the superensemble generator 240 provides a significant advantage over simply averaging forecasts from multiple forecast models because the present invention weights more heavily those models that are historically more accurate in forecasting a particular weather component at a specific geographical location or area. Furthermore, it will be appreciated that although only one weather component is illustrated in the example shown in FIG. 2, the superensemble generator can assign each forecast model multiple weights, such as a weight for each weather component. In this manner, the superensemble generator can determine the historical performance of a plurality of models in forecasting a plurality of weather components at a plurality of geographical locations or areas. For example, the superensemble generator may assign a first weight to a forecast model, wherein the weight corresponds to a predicted weather component, such as a daily high temperature at a particular location, while assigning a second weight to the same forecast model, where the second weight corresponds to a different predicted weather component, such as average daily wind speed. According to one preferred embodiment of the present invention, weights may be assigned to forecast models, or to each weather component corresponding to each predicted weather component of every forecast model. Therefore, it will be appreciated by those of skill in the art that the systems, methods and computer program products of the present invention effectively can combine the most accurate forecast models or the most accurate elements from a plurality of forecast models to more accurately formulate a multi-model superensemble forecast for predicting future weather.

Figure 3:
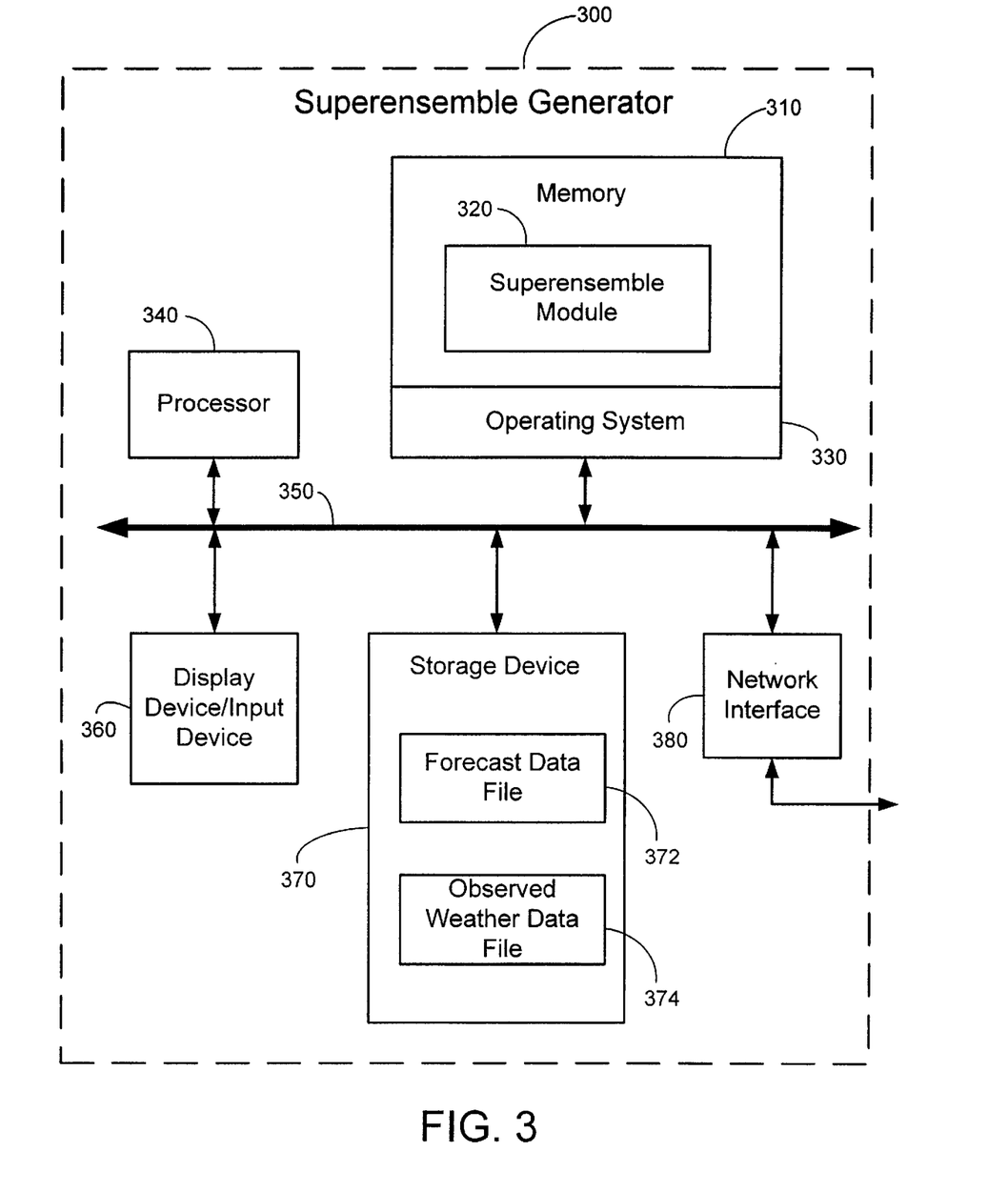
FIG. 3 shows a block diagram of a superensemble generator, according to one embodiment of the present invention .

FIG. 3 shows a block diagram of one embodiment of a superensemble generator 300, according to one aspect of the present invention. As shown in FIG. 3, the superensemble generator 300 includes computer hardware and/or software for implementing the methods described herein. The superensemble generator 300 includes a processor 340 that communicates with other elements within the generator 300 via a system interface or bus 350. Also included in the superensemble generator 300 is a display device/input device 360, for example, a keyboard or pointing device in combination with a monitor, for receiving and outputting data. Memory 310 is located within the superensemble generator 300 and includes a superensemble module 320, which controls the operation of the superensemble generator 300 as described herein with the assistance of the processor 340 and an operating system 330. The operating system 330 enables execution of the superensemble module 320 by the processor 340. Also located within the superensemble generator 300 is a network interface 380, for interfacing and communicating with other elements of a computer network. Lastly, the superensemble generator 300 includes a storage device 370, such as a hard disk drive, which contains files that are utilized by the superensemble module 320. These include a forecast data file 372 and an observed weather data file 374.

Upon receiving the observed weather data from one or more sources, the superensemble generator 300 stores the data in the observed weather data file 374. Likewise, both historical forecast information as well as forecast model information corresponding to future forecasts can be stored within the forecast data file 372 of the storage device 370. To calculate the historical performance of each forecast model in forecasting predicted weather components, the superensemble module 320 accesses the forecast data 372 and the observed weather data file 374, and, with the assistance of the processor 340, calculates the one or more weight factors for each of the forecast models. Thereafter, the superensemble module 320 combines the weights with the future forecast information, stored in the forecast data file 372, to produce the multi-model superensemble. The multi-model superensemble may be stored within the superensemble generator 300, such as within one or more files or databases not illustrated in FIG. 3. Although not illustrated, the superensemble generator 300 can also include one or more graphics programs for representing the multi-model superensemble via the display device 360. It will be appreciated by one of ordinary skill in the art that one or more of the superensemble generator 300 components may be located geographically remotely from other superensemble generator 300 components. Furthermore, one or more of the components may be combined, and additional components performing functions described herein may be included in the superensemble generator 300.

Figure 4:
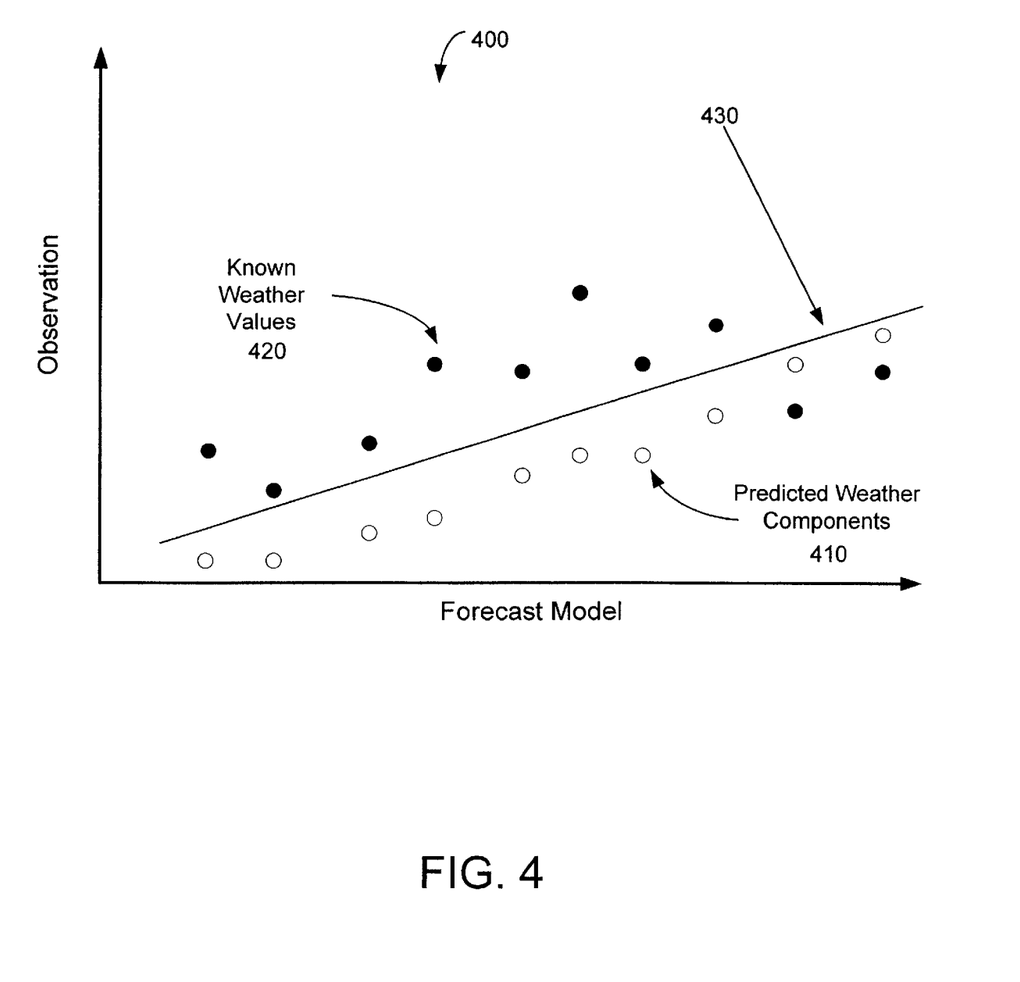
FIG. 4 shows a graph illustrating the methodology in which a superensemble generator of the present invention determines the historical performance of a weather model in forecasting a weather component, according to one aspect of the present invention.

FIG. 4 shows a graph 400 illustrating the methodology in which the superensemble generator determines the historical performance of a forecast model in forecasting a weather component, according to one aspect of the present invention. In particular, the graph 400 illustrates multiple predicted weather components 410 of one forecast model, where the multiple predicted weather components 410 make up the historical forecast information for the forecast model. For instance, the predicted weather components 410 illustrated in FIG. 4 may represent predicted daily high temperatures for a period of time in a particular geographical location or area. The graph 400 also illustrates observed weather data, specifically, known weather values 420 that correspond to the plurality of predicted weather components. For instance, the known weather values may be the measured values of the daily high temperatures corresponding to the predicted weather components 410 (i.e., predicted daily high temperatures).

The purpose for comparing the predicted weather components to known weather values is to determine the historical performance of forecast models in predicting past weather conditions. To determine this historical performance, the known weather components 420 are regressed by the superensemble generator, and more specifically, the superensemble module, against the predicted weather components 410 by least squares minimization. This regression defines a line 430, as illustrated in FIG.4. The line 430 is defined by Y=AX+B, where the slope of the line is A and the intersect of the line is B. The line 430 illustrates the direct relationship between the forecast and observation values over a given period of time, such as 3 to 4 months. The superensemble generator calculates this relationship because the systems, methods and computer program products of the present invention assume that the past forecasting error of a forecast model for a particular weather component will likely occur in future forecasts of the forecast model. Therefore, the relationship between the predicted components and known or observed values, as defined by the least squares minimization, is used to generate a weight that is given to that forecast model for future forecasts for that particular weather component.

According to one aspect of the invention, for each predicted weather component, the slope of the line defined by least squares minimization may be used to weight the corresponding forecast model. Although the line illustrated in FIG. 4 is linear and defined by least squares minimization, it should be appreciated by those of skill in the art that additional mathematical calculations can also be used to define the mathematical relationship between predicted weather components and known or observed weather values. For instance, according to one alternative aspect of the invention, the relationship between the values 420 and components 410 may be defined by a non-linear calculation. Furthermore, multiple linear regressions may be made for observed and predicted values corresponding to a relatively short time period, so that the line 430 illustrated in FIG. 4 may be represented by multiple linear line segments.

It will be appreciated that although a single regression may be used where there is one forecast model forecasting one weather component, there will be multiple regressions where multiple models and/or weather components are compared to known weather values. For instance, in a multiple regression, there will be a plurality of weighted values. These values can correspond to individual forecast models, or to individual weather components forecasted by a particular forecast model. Furthermore, although the regression can be made for historical forecasting information, such as predicted and observed data over a 3 or 4 month timeframe, it should be appreciated that because the model may be continuously run against observed and forecasted data, such that the regression technique of the present invention to weight future forecasts may be run daily, hourly, or continuously to generate forecasts based upon a most recent evaluation of the historical performance of forecast models.

The mathematical calculation of a multi-model superensemble will next be explained with reference to the mathematical expressions for determining the weights described with reference to FIG. 4. According to one aspect of the invention, the creation of a multi-model superensemble at a given geographical location may be calculated using a simple multiple regression of the forecast models with respect to the observed weather data. This regression provides the statistics deployed during the forecast phase, also referred to herein as the future time period, for which the superensemble forecast is to accurately forecast weather. The regression formula for creating the superensemble prediction is as follows:

$$S = Otm + \sum_{i=1}^{N} a_i(F_i - Ftm_i)$$

It will be appreciated by those of ordinary skill in the art this the above formula is standard multivariate regression expansion used in statistics. In the formula, S is the superensemble prediction, Otm is the time mean of an observed state, $a_i$ is the weight for model i, i is the model, N is the number of models, $F_i$ is the prediction by model I, and $Ftm_i$ is the time mean of the prediction by model i. Furthermore, $a_i$ are the regression coefficients determined from the least squares minimization shown in the following formula. The regression coefficients (as illustrated by the slope of the linear segment in the example illustrated in FIG. 4) can be determined by minimization of the following function:

$$G = \sum_{t=0}^{t-train} (S_t - O_t)^2$$

This formula is the standard formula used for least squares minimization, where O is the observed state (or known weather value), t is time, and t-train is the length of period for which historical forecast information is collected from a forecast model. Additionally, $S_t$ is the superensemble (S) solved in the previous formula at time t and $O_t$ is the observed value at time t. These weights are used, in combination with the forecast models, to provide the multi-model superensemble. More specifically, the weights are applied to the plurality of forecast models used to generate the multi-model superensemble. Thereafter, each of the plurality of weighted forecast models are added to generate the multi-model superensemble.

Figure 5:
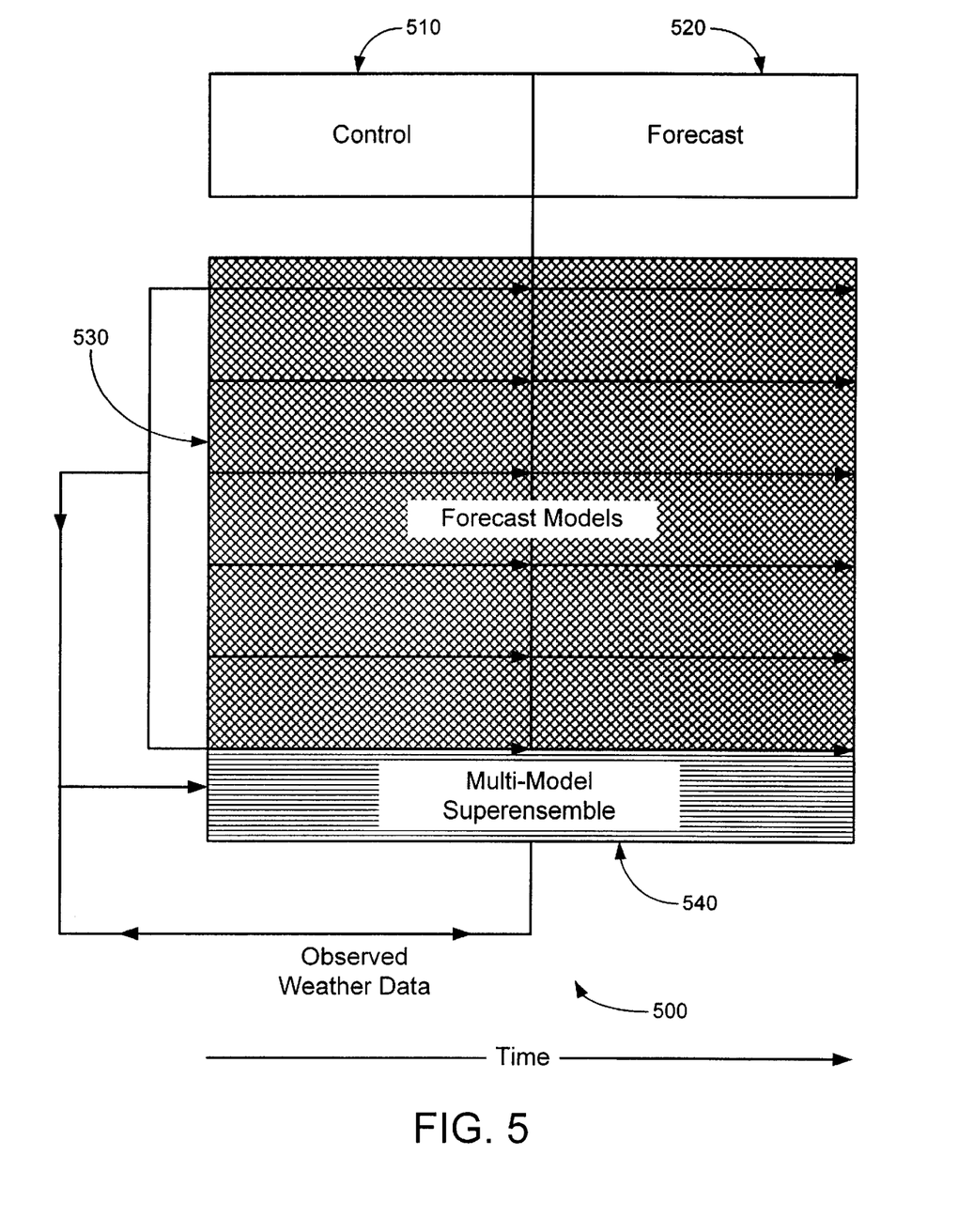
FIG. 5 shows a block diagram illustrating the combination of multiple forecast models to produce a multi-model superensemble, according to one aspect of the present invention.

FIG. 5 shows a block diagram 500 illustrating the combination of multiple models to produce a multi-model superensemble, according to one aspect of the present invention. The block diagram is divided into two halves, a control 510 and a forecast 520. The control 510 indicates a period of time in which historical forecast information is collected from forecast models 530, and the forecast 520 represents a future forecast period of time, in which observed weather data is unknown. The block diagram 500 indicates that the control 510 and collected observed data is collectively used to evaluate the historical performance of the forecast models 530. Furthermore, as illustrated by the timeline in the block diagram, the multi-model superensemble, which is based on the historical performance of the forecast models as determined by the superensemble generator with the forecast model data and observed weather data, predicts future forecasts given future forecast information provided by the forecast models. Therefore, although the superensemble generator generates a multi-model superensemble that can forecast weather in a future period of time, the superensemble generator does so using future forecast information provided by the forecast models.

Although the multi-model superensemble is most effective for relatively short term weather forecasting, such as 6 to 10 day weather forecasting, it should be appreciated that the multi-model superensemble forecast can be utilized to generate weather forecasts for long term weather predictions. Therefore, the forecast 520 could be as long as one or two years. Where such a lengthy forecast 520 is predicted by the present invention, it should be appreciated that there is likewise a lengthy period for the control 510, as a relatively short control 510 could include anomalies that may significantly effect the weight given to each forecast model. Therefore, the control 510 should be collected for a time period at least twice the length of the time period for the (future) forecast 520.

It should be appreciated that one advantage of the present invention is that no matter how many forecast models are used to generate the multi-model superensemble of the present invention, the multi-model superensemble forecast is always more accurate in predicting a future weather component than the worst predicting model used to create the superensemble for the prediction of a given weather component. This results because the multi-model superensemble weights multiple forecast models, each based upon their historical performance in forecasting weather, to create the multi-model superensemble. On the other hand, in a best case scenario, a multi-model superensemble according to the present invention outperforms all model forecasts for each weather component.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for generating an accurate weather forecast model, comprising:
    collecting historical forecast information from a plurality of weather models, wherein the historical forecast information includes at least one predicted weather component, and wherein the historical forecast information corresponds to a past period of time;
    accumulating observed weather data, wherein the observed weather data corresponds to a plurality of known weather values, wherein at least one known weather value of the plurality of known weather values corresponds to the at least one predicted weather component, and wherein the observed weather data corresponds to the past period of time;
    comparing the historical forecast information to the observed weather data to determine the historical performance of each weather model of the plurality of weather models, and
    generating a multi-model superensemble of the weather models, wherein the multi-model superensemble is based upon the historical performance of each weather model of the plurality of weather models.

2. The method of claim 1, wherein comparing the historical forecast information to the observed weather data to determine the historical performance of each weather model comprises comparing the at least one known weather value to the at least one predicted weather component.

3. The method of claim 2, wherein comparing the at least one known weather value to the at least one predicted weather component comprises calculating at least one weight factor for the at least one predicted weather component.

4. The method of claim 2, wherein comparing the at least one known weather value to the at least one predicted weather component comprises calculating at least one weight factor for the at least one predicted weather component by least squares minimization.

5. The method of claim 1, wherein generating a multi-model superensemble of the weather models comprises generating a multi-model superensemble based upon a combination of weather models weighted by their respective historical performances.

6. The method of claim 4, wherein generating a multi-model superensemble of the weather models comprises generating a multi-model superensemble based upon a summation of the at least one weight factor for the at least one predicted weather component of each of the plurality of weather models.

7. The method of claim 1, further comprising collecting future forecast information from the plurality of weather models corresponding to a future period of time, and wherein generating a multi-model superensemble comprises generating a multi-model superensemble based upon the historical performance of each weather model of the plurality of weather models and the future forecast information.

8. The method of claim 7, wherein generating a multi-model superensemble comprises weighting the future forecast information from the plurality of weather models based upon the historical performance of each weather model of the plurality of weather models.

9. A method for generating accurate weather forecasts, comprising:
    collecting historical forecast information from a plurality of weather models, wherein the historical forecast information includes at least one predicted weather component, and wherein the historical forecast information corresponds to a past period of time;
    accumulating observed weather data corresponding to a plurality of known weather values, wherein at least one known weather value of the plurality of known weather values corresponds to the at least one predicted weather component, and wherein the observed weather data corresponds to the period of time;
    comparing the historical forecast information to the observed weather data to determine the historical performance of each weather model of the plurality of weather models;
    calculating at least one weight for each weather model, based at least in part upon the historical performance of each weather model in forecasting the at least one predicted weather component;
    combining the weights for each weather model with future forecast information from the plurality of weather models, wherein the future forecast information corresponds to a future period of time, to generate a multi-model superensemble forecast.

10. The method of claim 9, wherein generating a multi-model superensemble forecast comprises combining the weather models based on their respective weights.

11. The method of claim 9, wherein comparing the historical forecast information to the observed weather data to determine the historical performance of each weather model comprises comparing the at least one known weather value to the at least one predicted weather component.

12. The method of claim 11, wherein comparing the at least one known weather value to the at least one predicted weather component comprises calculating at least one weight factor for the at least one predicted weather component.

13. The method of claim 11, wherein comparing the at least one known weather value to the at least one predicted weather component comprises calculating at least one weight factor for the at least one predicted weather component by least squares minimization.

14. A method for generating accurate weather forecasts, comprising:
    accumulating historical forecast information from a plurality of weather models, where the historical forecast information is derived prior to the occurrence of weather forecasted by the plurality of weather models, and wherein the historical forecast information includes a plurality of predicted weather components related to expected weather conditions;
    collecting observed weather data after the occurrence of the weather forecasted by the plurality of weather models, wherein the observed weather data includes known weather values corresponding to at least some of the plurality of predicted weather components;
    weighting the historical performance of each weather model in predicting the plurality of predicted weather components by comparing the accumulated historical forecast information to the observed weather data, and generating a superensemble weather model based upon a combination of each weighted weather model.

15. The method of claim 14, wherein weighting the historical performance of each weather model in predicting the plurality of predicted weather components comprises weighting the historical performance of each weather model by a least squares minimization calculation between each weather model and the observed weather data.

16. The method of claim 14, wherein generating a superensemble weather model based upon a combination of each weighted weather model comprises combining each weighted weather model to develop a forecast for future weather conditions.

17. A system for generating an accurate weather forecasting model, comprising:
  a plurality of weather models, wherein the weather models include historical forecasts for past weather conditions and prospective forecasts for future weather conditions;
  observed weather data corresponding to the past weather conditions, and
  a superensemble generator, in communication with the plurality of weather models and observed weather data, for producing a superensemble forecast, wherein the superensemble generator determines the historical performance of the plurality of weather models based on a comparison of the historical forecasts for past weather conditions to the observed weather data, and wherein the superensemble forecast is based at least in part upon the historical performance of the plurality of weather models and the prospective forecasts for future weather conditions.

18. The system of claim 17, wherein the historical forecasts include at least one predicted weather component, wherein the observed weather data corresponds to a plurality of known weather values, and wherein at least one known weather value of the plurality of known weather values corresponds to the at least one predicted weather component.

19. The system of claim 18, wherein the observed weather data consists of data selected from the group consisting of precipitation, temperature, wind speed and direction, height, pressure, atmospheric moisture content, and tropical cyclone positions and intensities.

20. The system of claim 18, wherein the superensemble generator is in communication with the plurality of weather models via the Internet, a wide area network, or a local area network.

21. The system of claim 18, wherein the superensemble generator comprises:
  a processor, and
  a superensemble module in communication with said processor, wherein
  the superensemble module and processor operate to compare the historical forecasts to the observed weather data to determine the historical performance of the plurality of weather model.

22. A computer program product for generating an accurate weather forecast model, comprising:
  a computer readable storage medium having computer-readable program code means embodied in said medium, said computer-readable program code means comprising:
    computer-readable program code means for collecting historical forecast information from a plurality of weather models, wherein the historical forecast information includes at least one predicted weather component, and wherein the historical forecast information corresponds to a past period of time;
    computer-readable program code means for accumulating observed weather data, wherein the observed weather data corresponds to a plurality of known weather values, wherein at least one known weather value of the plurality of known weather values corresponds to the at least one predicted weather component, and wherein the observed weather data corresponds to the past period of time;
    computer readable program code means for comparing the historical forecast information to the observed weather data to determine the historical performance of each weather model of the plurality of weather models, and
    computer-readable program code means for generating a multi-model superensemble of the weather models, wherein the multi-model superensemble is based upon the historical performance of each weather model of the plurality of weather models.

23. The method of claim 22, wherein the computer-readable program code means for comparing the historical forecast information to the observed weather data to determine the historical performance of each weather model comprises computer-readable program code means for comparing the at least one known weather value to the at least one predicted weather component.

24. The method of claim 23, wherein the computer-readable program code means for comparing the at least one known weather value to the at least one predicted weather component comprises computer-readable program code means for calculating at least one weight factor for the at least one predicted weather component.

25. The method of claim 23, wherein computer-readable program code means for comparing the at least one known weather value to the at least one predicted weather component comprises computer-readable program code means for calculating at least one weight factor for the at least one predicted weather component by least squares minimization.

26. The method of claim 22, wherein the computer-readable program code means for generating a multi-model superensemble of the weather models comprises computer-readable program code means for generating a multi-model superensemble based upon a combination of weather models weighted by their respective historical performances.

27. The method of claim 25, wherein the computer-readable program code means for generating a multi-model superensemble of the weather models comprises computer-readable program code means for generating a multi-model superensemble based upon a summation of the at least one weight factor for the at least one predicted weather component of each of the plurality of weather models.

28. The method of claim 22, further comprising computer-readable program code means for collecting future forecast information from the plurality of weather models corresponding to a future period of time, and wherein the computer-readable program code means for generating a multi-model superensemble comprises computer-readable program code means for generating a multi-model superensemble based upon the historical performance of each weather model of the plurality of weather models and the future forecast information.

29. The method of claim 28, wherein the computer-readable program code means for generating a multi-model superensemble comprises computer-readable program code means for weighting the future forecast information from the plurality of weather models based upon the historical performance of each weather model of the plurality of weather models.

* * * * *

UNITED STATES PATENT AND TRADEMARK OFFICE
CERTIFICATE OF CORRECTION

PATENT NO. : 6,535,817 B1
DATED : March 18, 2003
INVENTOR(S) : Tiruvalam N. Krishnamturi

It is certified that error appears in the above-identified patent and that said Letters Patent is hereby corrected as shown below:

Column 1,
Line 13, before "FIELD OF THE INVENTION," please insert -- STATEMENT REGARDING FEDERALLY SPONSORED RESEARCH OR DEVELOPMENT This invention was made with Government support under ATM9710336 and ATM9612894 awarded by the National Science Foundation; NA86GP0031 and NA77WA0571 by the National Oceanic and Atmospheric Administration; and NAG5-4729 and NAG5-1199 by the National Aeronautics and Space Administration. The Government has certain rights in the invention. --.

Signed and Sealed this

Second Day of November, 2004

JON W. DUDAS
*Director of the United States Patent and Trademark Office*